UNITED STATES PATENT OFFICE.

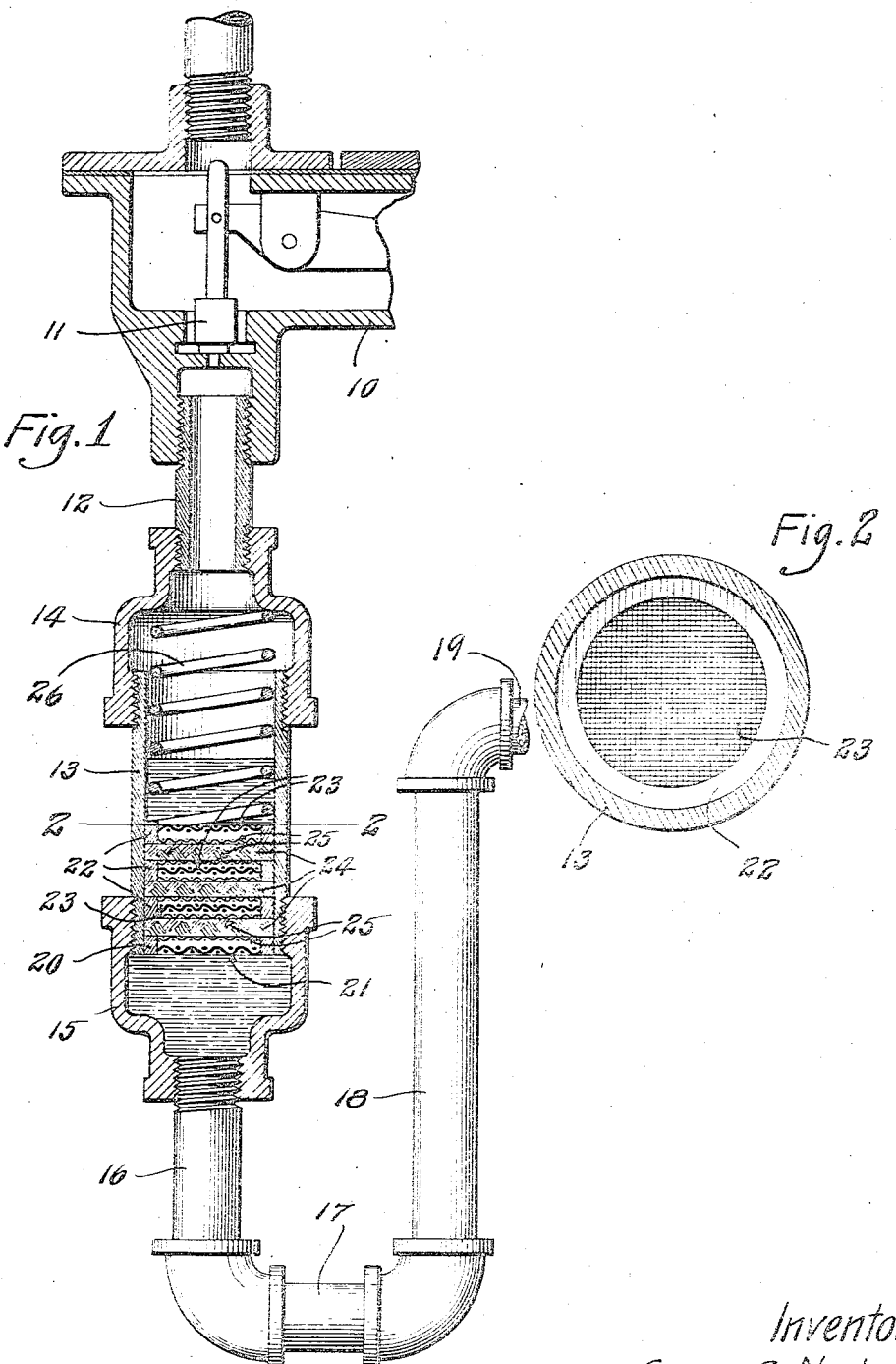

GEORGE S. NEELEY, OF ST. LOUIS, MISSOURI, ASSIGNOR OF ONE-HALF TO THOMAS O. MOLONEY, OF ST. LOUIS, MISSOURI.

GAS-PURIFIER.

1,236,000.  Specification of Letters Patent.  Patented Aug. 7, 1917.

Original application filed December 9, 1914, Serial No. 876,274. Divided and this application filed June 9, 1915. Serial No. 33,143.

*To all whom it may concern:*

Be it known that I, GEORGE S. NEELEY, a citizen of the United States, residing at St. Louis, Missouri, have invented a certain new and useful Improvement in Gas-Purifiers, of which the following is a full, clear, and exact description, such as will enable others skilled in the art to which it appertains to make and use the same, reference being had to the accompanying drawings, forming part of this specification.

My invention relates to a gas purifier designed for use in connection with an ordinary gas regulator which is located in the tubular connection from the street main to the piping of a building, the subject-matter of this application being a division of my application for U. S. Letters Patent on gas purifier, filed December 9, 1914, Serial No. 876,274.

The principal objects of my present invention are to provide a comparatively simple purifier or filter which is adapted to be located immediately below or in front of the regulating valve which is located in the tubular connection leading from the street main to the piping of the building, and which purifier will be effective to a high degree in eliminating from the gas passing through the regulating valve all foreign substance, such as dust and rust from the interior of the street mains and service pipes, and further to provide a gas purifier and filter having a trap which contains a body of liquid filtering material such as oil and through which the gas passes before entering the regulating device.

It will be understood that in gas distribution it is necessary to make use of regulating valves for the purpose of reducing the pressure between the street mains and the point of use, and it is, of necessity, a requirement that these gas regulating valves be accurate and positive in action.

The ordinary regulating device is equipped with a valve having a flexible member of leather, rubber or analogous material which normally rests on a flat seat and closes the orifice in said seat. A source of much of the trouble and inoperativeness in gas regulating valves, is due to the fact that small particles of foreign substance such as dust or rust which forms on the inner surfaces of the street mains is carried by the gas into the regulating valve and lodges on the seat or the compressible member of the valve, thereby preventing a tight joint between said valve and seat, and permitting leakage from the comparatively high pressure street mains to the house piping. As a result, "seal blows" often occur, the same being attended by considerable danger inasmuch as they frequently result in explosions and asphyxiations. Furthermore, "seal blows" are very destructive to painting on the exterior of buildings.

In actual service conditions it has been demonstrated that in gas distribution systems where high pressures are used, practically forty or fifty per cent. of complaints in gas service is due to trouble in the regulating devices, and this trouble in turn is directly traceable to leakage of gas through the valves of said regulating devices. As a result much time, labor and consequent expense is involved in opening the housings of the regulating devices and cleaning the valves thereof, and I propose to eliminate all this trouble and expense by providing a simple gas purifier in the form of a mechanical filter, the same being located immediately adjacent to the regulating device, thus preventing all dust, rust, etc., from entering the regulating device and interfering with the proper operation of the valve therein.

A further object of my invention is to provide a purifier and filter with a trap which contains a body of oil and to arrange in said trap in a position where it will be submerged in said oil one or more beds or layers of fibrous material, such as mineral wool, and thus as gas flows through the purifier it will not only be freed of practically all foreign substance, such as dust or rust, but will absorb and carry with it a certain amount of oil which in turn will be deposited on the valve and valve seat of the regulator, thereby providing sufficient lubrication to insure the proper operation of the valve and maintain it in serviceable condition.

With the foregoing and other objects in view, my invention consists in certain novel features of construction and arrangement of parts, hereinafter more fully described, claimed and illustrated in the accompanying drawings, in which—

Figure 1 is a side elevational view partly in vertical section of my improved purifier and the regulator to which said purifier is connected.

Fig. 2 is an enlarged horizontal section taken approximately on the line 2—2 of Fig. 1.

Referring by numerals to the accompanying drawings, 10 designates the housing of the regulating device, 11 the valve therein and 12 the gas supply pipe which leads to said regulating device. Connected to this pipe and preferably at a point immediately adjacent to the housing 10 is my improved purifier and filter, the same comprising a substantially tubular or hollow body 13, the upper end of which is connected to pipe 12 by a nipple 14. Connected to the lower end of the hollow body 13 is a nipple 15 and connected to the lower end of the latter is the upper end of a short section of pipe 16. The lower end of this pipe 16 is connected by a short horizontally disposed tubular member 17 to the lower end of a vertically disposed pipe 18, the length of which is substantially equal to the length of the member 13, nipples 14 and 15 and tubular member 16.

The upper end of pipe 18 is connected in any suitable manner to gas supply pipe 19, which leads from the service pipe or street main.

Fixed in any suitable manner to the lower end of member 13 is a ring 20 to which is fixed a section 21 of foraminous or reticulated material. Removably positioned in the lower portion of member 13 and above the fixed ring 20 is a series of rings 22, each carrying a section 23 of foraminous or reticulated material. These rings 22 are arranged at suitable distances apart and located in the spaces between said rings are layers or beds 24 of fibrous material such as mineral wool.

Positioned above and below each layer of fibrous material 24 is a section of woven fabric 25, such as muslin, the same being for the purpose of holding the bodies or layers of fibrous material in proper position between the foraminous or reticulated sections, and also for the purpose of preventing any minute particles of dust or rust from passing through the filtering device.

Positioned in the upper portion of member 13 and nipple 14 is a compression spring 26, the lower end of which bears directly against the upper one of the rings 22, thus holding all of said rings and the interposed bodies or layers of fibrous material in proper position in the lower portion of member 13.

The member 13, nipple 15, pipes 16, 17 and 18 form a substantially U-shaped trap in the pipe which conveys the gas from the street main to the regulating device, and in carrying out my invention, I locate a body of liquid filtering material such as oil, glycerin or analogous unctuous substance within this trap, said oil being in sufficient quantity to maintain a level within member 13 a substantial distance above the uppermost one of the rings 22. Thus, all of said rings with their sections of foraminous or reticulated material and the interposed layers or body of fibrous material are submerged in oil.

The operation of my improved purifier and filter is apparent, for it will be understood that the gas in passing from supply pipe 19 to the regulator must necessarily pass through the trap which is partially filled with oil and also through the various layers of fibrous material 24, the sections of foraminous or reticulated material 21, and the sections 25 of fabric. In thus passing through the trap and filter, all impurities such as dust, rust, etc., will be effectually removed from the gas, and it will enter and pass through the regulating device in a thoroughly purified condition.

The gas in passing through the body of oil within the trap and filter will necessarily absorb a certain amount of said oil, and this absorbed portion will be carried to and absorbed by the leather on the regulating valve, thereby maintaining said leather in pliable condition.

The device can be readily assembled or taken apart, thus facilitating repairs or renewal of the layers of fibrous material and the sections of fabric, and for the purpose of renewing the supply of oil when the old supply has become dirty by reason of continued service.

A purifier and filter of my improved construction is comparatively simple, can be easily and cheaply manufactured, is effective in removing from the gas entering the regulating valve all foreign substances, such as dust or rust, and consequently practically all of the trouble now arising from leaky regulating valves is wholly eliminated.

It will be readily understood that minor changes in the size, form and construction of the various parts of my improved purifier and filter can be made and substituted for those herein shown and described, without departing from the spirit of my invention, the scope of which is set forth in the appended claims.

I claim:

1. The combination with a pressure regulator, the valve of which is provided with a disk of leather or fibrous material, of a combined gas purifier and valve lubricating device directly connected to the regulator, said device including a U-shaped trap, one leg of which is directly connected to the regulator adjacent to the valve therein, mechanical filtering elements located in said leg and both legs of said device being filled with liquid lubricant.

2. The combination with a fluid pressure regulator, the valve of which is provided with a disk of leather or fibrous material, of a combined gas purifier and valve lubricating device, the same comprising a housing directly connected to the regulator adjacent to the valve therein, mechanical filtering elements located within said housing, a substantially U-shaped trap, one leg of which is connected to the lower portion of the housing and both of the legs of said trap and a portion of said housing being filled with liquid lubricant.

3. The combination with a fluid pressure regulator, the valve of which is provided with a disk of leather or fibrous material, of a combined gas purifier and valve lubricating device, the same comprising a housing directly connected to the regulator adjacent to the valve therein, a series of sections of reticulated material in the lower portion of said housing, sections of fibrous material interposed between said sections of reticulated material, means within the housing for holding the sections of reticulated material and sections of fibrous material in close contact with each other, a substantially U-shaped trap, one leg of which is directly connected to the lower portion of the housing and both legs of which trap and said housing are filled with liquid lubricant.

4. The combination with a high pressure gas distributing system, a low pressure gas service system and a gas regulator between said systems, which regulator includes a valve having a disk of leather or fibrous material, of a combined gas purifier and valve disk lubricating device, located between the distributing system and the regulator, said device comprising a substantially U-shaped trap, mechanical filtering means located in said trap and both legs of said trap being partially filled with liquid lubricant.

5. The combination with a high pressure gas distributing system, a low pressure gas service system and a gas regulator between said systems, which regulator includes a valve having a disk of leather or fibrous material, of a combined gas purifier and valve disk lubricating device located between the distributing system and the regulator, said device comprising a substantially U-shaped trap, sections of reticulated material located in one of the legs of said trap, sections of fibrous material interposed between the sections of reticulated material and both legs of said trap being filled with liquid lubricant which submerges the sections of reticulated and fibrous material.

6. A combined gas purifier and regulating valve lubricating device comprising a substantially U-shaped trap, one leg of which is adapted to be connected directly to the gas regulator, mechanical filtering devices located in said trap, and both legs of said trap being filled with liquid lubricant which submerges the mechanical filtering devices.

7. A combined gas purifier and gas regulating valve lubricating device comprising a substantially U-shaped trap, one leg of which is directly connected to the gas regulating valve, a series of disks of reticulated material located in said trap, sections of fibrous material interposed between the sections of reticulated material, and said trap being partially filled with liquid lubricant.

In testimony whereof I hereunto affix my signature in the presence of two witnesses, this 26th day of April, 1915.

GEORGE S. NEELEY.

Witnesses:
EUGENE J. REILLY,
M. A. HANDEL.